United States Patent
Ogiwara et al.

(10) Patent No.: US 10,059,194 B2
(45) Date of Patent: Aug. 28, 2018

(54) FLUID STORAGE APPARATUS

(71) Applicant: HONDA MOTOR CO., LTD., Tokyo (JP)

(72) Inventors: Naoki Ogiwara, Wako (JP); Masaki Wakao, Wako (JP); Akihiro Taguchi, Wako (JP); Kotaro Tanaka, Wako (JP); Takeshi Watanabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 175 days.

(21) Appl. No.: 14/926,247

(22) Filed: Oct. 29, 2015

(65) Prior Publication Data
US 2016/0121712 A1    May 5, 2016

(30) Foreign Application Priority Data
Oct. 30, 2014 (JP) .................. 2014-221825

(51) Int. Cl.
F24D 19/08 (2006.01)
B60K 15/03 (2006.01)

(52) U.S. Cl.
CPC .... B60K 15/03 (2013.01); *B60K 2015/03171* (2013.01); *B60K 2015/03217* (2013.01); *Y10T 137/3084* (2015.04)

(58) Field of Classification Search
CPC .......... B60K 15/03; B60K 2015/03171; B60K 2015/3217; B60K 2015/03256; B60K 2015/03217; Y02T 10/123; Y10T 137/3084; Y10T 137/86324; Y10T 137/86332; Y10T 137/86348

USPC ................. 137/197, 587, 588, 590
See application file for complete search history.

(56) References Cited

U.S. PATENT DOCUMENTS

| 2,006,236 A * | 6/1935 | Emanueli | H02G 15/26 138/30 |
| 2,168,891 A * | 8/1939 | Wiggins | B65D 90/34 137/493 |
| 2,355,874 A * | 8/1944 | Laird | B65D 88/34 220/216 |

(Continued)

FOREIGN PATENT DOCUMENTS

| JP | 167357 | 10/1944 |
| JP | 60-42033 U | 3/1985 |

(Continued)

OTHER PUBLICATIONS

Japanese Notification of Reasons for Refusal dated Jun. 6, 2017 (mailing date), issued in counterpart Japanese Patent Application No. 2014-221825 with English translation. (8 pages).

(Continued)

*Primary Examiner* — Craig J Price
(74) *Attorney, Agent, or Firm* — Westerman, Hattori, Daniels & Adrian, LLP

(57) ABSTRACT

A fluid storage apparatus includes a guiding mechanism that linearly guides a flexible container in accordance with expansion and contraction of the flexible container. The guiding mechanism includes a guiding column that is disposed adjacent to the flexible container and that extends linearly and a slider that has a guiding hole, in which the guiding column is inserted, and that is formed on an upper edge portion of the flexible container.

11 Claims, 4 Drawing Sheets

(56) References Cited

U.S. PATENT DOCUMENTS

| | | | | |
|---|---|---|---|---|
| 2,432,025 | A * | 12/1947 | Lorenz | B64D 37/06 137/590 |
| 2,437,058 | A * | 3/1948 | Waters | B65D 88/522 217/12 R |
| 3,329,301 | A * | 7/1967 | Lee | B65D 88/34 137/423 |
| 3,494,509 | A * | 2/1970 | McGuire | B65D 88/18 222/107 |
| 3,648,886 | A * | 3/1972 | Pringle | B60K 15/03177 220/62.11 |
| 3,724,497 | A * | 4/1973 | Federer | B65D 88/18 137/575 |
| 3,747,800 | A * | 7/1973 | Viland | B65D 90/38 220/560.02 |
| 3,949,720 | A * | 4/1976 | Zipprich | B60K 15/03504 123/518 |
| 4,629,589 | A * | 12/1986 | Gupta | B01F 3/04531 222/129.1 |
| 5,199,609 | A * | 4/1993 | Ash, Jr. | B67D 1/0406 141/114 |
| 6,155,448 | A * | 12/2000 | Ishikawa | B60K 15/03 220/562 |
| 6,698,692 | B1 * | 3/2004 | Tichenor | B64D 37/24 244/135 R |
| 7,073,530 | B2 * | 7/2006 | Pyle | B65D 88/34 137/587 |
| 7,441,569 | B2 * | 10/2008 | Lease | G01F 23/0069 137/558 |
| 8,807,383 | B2 * | 8/2014 | Weng | B65D 33/00 220/216 |

FOREIGN PATENT DOCUMENTS

| | | |
|---|---|---|
| JP | 60-69539 U | 5/1985 |
| JP | 2-17466 U | 2/1990 |
| JP | 2002-106439 A | 4/2002 |
| JP | 2005-227288 A | 8/2005 |
| JP | 2012-25257 A | 2/2012 |

OTHER PUBLICATIONS

Office Action dated Nov. 8, 2016, issued in counterpart Japanese Patent Application No. 2014-221825, with machine translation. (8 pages).

* cited by examiner

FLUID STORAGE APPARATUS

CROSS REFERENCES TO RELATED APPLICATIONS

The present application claims priority under 35 U.S.C. § 119 to Japanese Patent Application No. 2014-221825, filed Oct. 30, 2014, entitled "Fluid Storage Apparatus." The contents of this application are incorporated herein by reference in their entirety.

TECHNICAL FIELD

The present disclosure relates to a fluid storage apparatus that includes a flexible container.

BACKGROUND

Japanese Unexamined Patent Application Publication No. 2012-025257 (hereinafter referred to as Patent Document 1) has been proposed to obtain a mounting structure of a fuel tank that enables a fuel tank with a variable volume to be mounted on a vehicle body without obstructing deformation of the fuel tank ([0005] and Abstract). In order to realize this mounting structure, a fuel tank 14 in Patent Document 1 includes a tank upper-layer portion 16, a tank lower-layer portion 18, and a tank expansion and contraction portion 20. The tank expansion and contraction portion 20 expands in response to an increase in the internal pressure of the fuel tank 14, so that the volume of the fuel tank 14 is increased. A floor panel 34 includes a clearance portion 44 located above the tank upper-layer portion 16 so as to form an expansion space 46, and thus, an increase in the volume of the fuel tank 14 will not be obstructed (Abstract and FIG. 1).

As described above, in Patent Document 1, since the fuel tank 14 includes the tank expansion and contraction portion 20, the fuel tank 14 has flexibility, so that a flexible container is realized. In addition, in Patent Document 1, the expansion space 46 that allows the tank expansion and contraction portion 20 of the fuel tank 14 to expand is formed (Abstract and FIG. 1). In the case where the tank expansion and contraction portion 20 is made of a relatively soft material, it is assumed that the fuel tank 14 is guided to the clearance portion 44. In a configuration, such as that of a vehicle and the like, in which vibration and displacement are generated relatively frequently, there is a possibility that the tank expansion and contraction portion 20 and the like will become deformed, which in turn leads to deterioration of the fuel tank 14.

In addition, since the shape of the tank expansion and contraction portion 20 is inconsistent, in the case of trying to detect the remaining amount of fuel (or fluid) in the fuel tank 14 on the basis of the shape of the fuel tank 14, it is difficult to detect with high accuracy the amount of fuel (fluid).

SUMMARY

The present application, for example, describes a fluid storage apparatus capable of realizing at least one of avoiding a positional deviation of a flexible container and detecting with high accuracy the amount of a fluid in the flexible container.

A fluid storage apparatus according to the present disclosure includes a flexible container that includes an inlet port, through which a fluid is injected, and a discharge port, through which the fluid is discharged, and that expands and contracts in accordance with an amount of the fluid in the flexible container and a guiding mechanism that linearly guides the flexible container in accordance with expansion and contraction of the flexible container. The guiding mechanism includes a guiding column that is adjacent to the flexible container and that extends linearly and a slider that has a guiding hole, in which the guiding column is received, and that is formed on an upper edge portion of the flexible container.

Accordingly, when the flexible container expands or contracts, the slider, which is formed on the flexible container, is guided linearly by the guiding column. Therefore, occurrence of deviation in the position of the flexible container may be suppressed.

Moreover, the flexible container is supported by the guiding column via the slider. Consequently, the reproducibility of changes in the position of the flexible container in response to fluctuations of the amount of the fluid may be improved. Therefore, in the case where the amount of the fluid is detected in accordance with the position of the flexible container, the amount of the fluid may be detected with high accuracy.

At least a portion of the slider may be formed of an electric conductor, and the fluid storage apparatus may further include a container in which the flexible container is accommodated, a position detector that is formed on a side on which the container is disposed and that detects a position of the electric conductor, and a remaining amount calculation part that calculates a remaining amount of the fluid based on the position of the electric conductor.

With this configuration, the amount of the fluid may be detected on the basis of a degree of the expansion and contraction of the flexible container in accordance with an actual amount of the fluid. Therefore, the accuracy with which the amount of the fluid is detected may be improved compared with, for example, a configuration in which the amount of the fluid is detected on the basis of the difference between an injection amount of the fluid and a discharge amount of the fluid. In addition, in the case where the fluid storage apparatus is used in combination with another remaining amount sensor that detects the amount of the fluid, the detection accuracy may be improved, or a fail-safe mechanism may be realized.

In the case where the fluid is a liquid, a top surface of the flexible container may be planar when the flexible container is fully filled with the liquid, and the fluid storage apparatus may include a gas discharge valve that is disposed on the top surface of the flexible container and that discharges gas present in the flexible container and a top-surface-shape control mechanism that controls a shape of the top surface in such a manner as that a valve-arranged portion, which is a portion of the top surface on which the gas discharge valve is disposed, positioned higher than other portions of the top surface.

With this configuration, the gas in the flexible container may accumulate in the gas discharge valve. Therefore, in the case where the liquid is volatile, the volatilization volume of the liquid may be reduced.

The top-surface-shape control mechanism may include an urging member that urges the valve-arranged portion upward. With this configuration, even in the case where the gas discharge valve is disposed on the top surface, the valve-arranged portion may easily be positioned higher relative to the other portions of the top surface.

The flexible container may have a shape based on a rectangular parallelepiped shape when the flexible container is fully filled with the fluid. A plurality of the guiding columns may be disposed in such a manner as to correspond to four corners of the flexible container, and a plurality of the sliders may be disposed on upper corners of the flexible container. With this configuration, the flexible container has a relatively simple shape, and thus, the flexible container may be easily manufactured, and accommodation of the flexible container in an apparatus that uses the flexible container may be facilitated.

According to the present disclosure, at least one of avoiding a positional deviation of a flexible container and detecting with high accuracy the amount of a fluid in the flexible container may be realized.

BRIEF DESCRIPTION OF THE DRAWINGS

The advantages of the disclosure will become apparent in the following description taken in conjunction with the following drawings.

DETAILED DESCRIPTION

A. Embodiment

A1. Configuration (A1-1. Overall Configuration)

Figure 1:
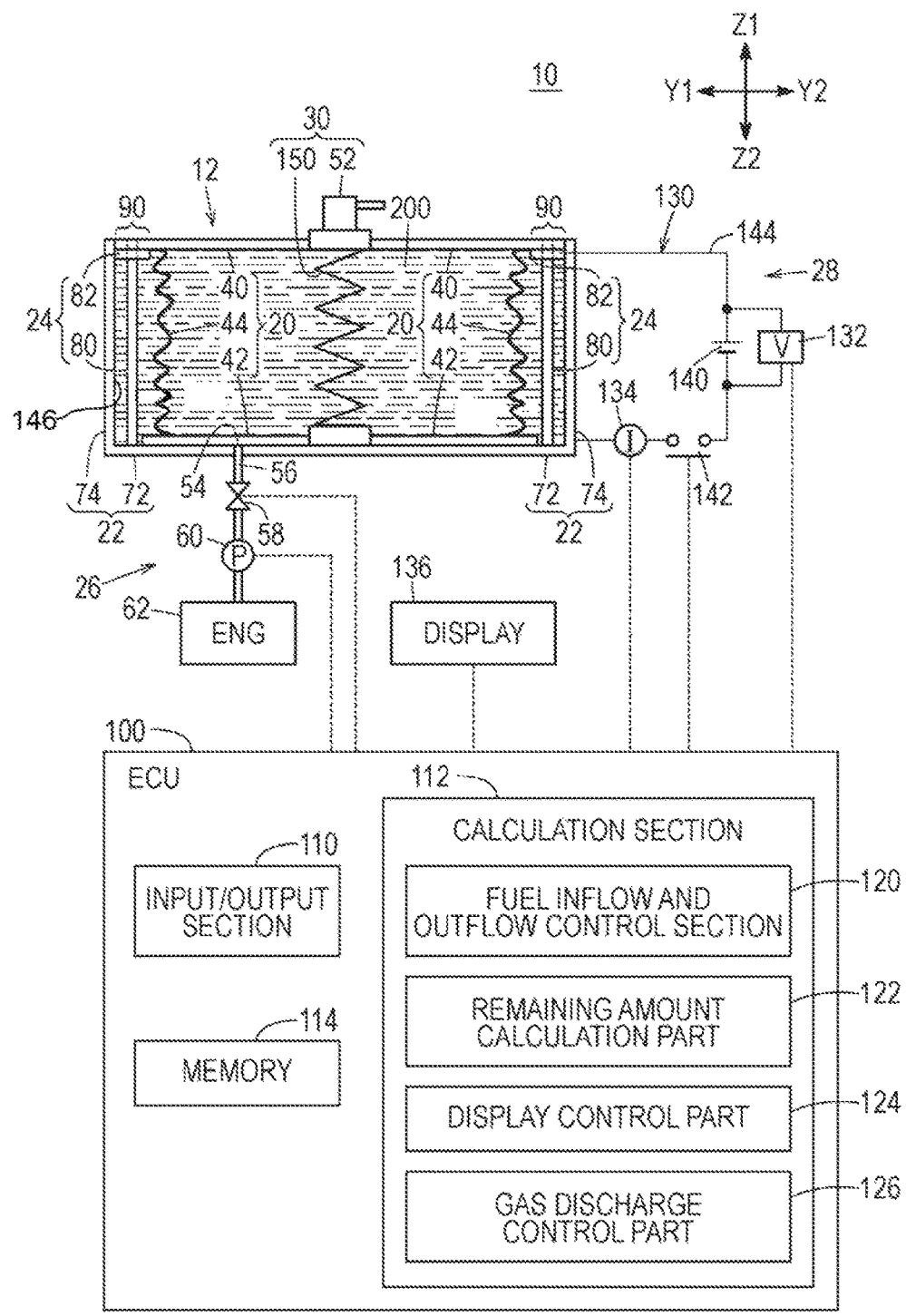
FIG. 1 is a diagram illustrating, in a simplified manner, a configuration of a vehicle that includes a fluid storage apparatus according to an embodiment of the present disclosure.
Figure 2:
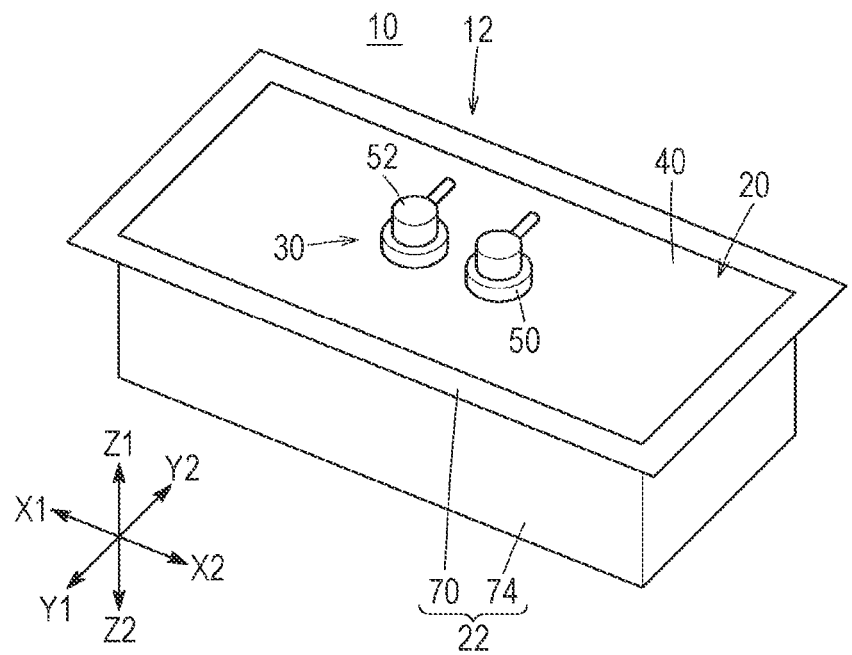
FIG. 2 is a perspective view illustrating a portion of the fluid storage apparatus in a simplified manner.
Figure 3:
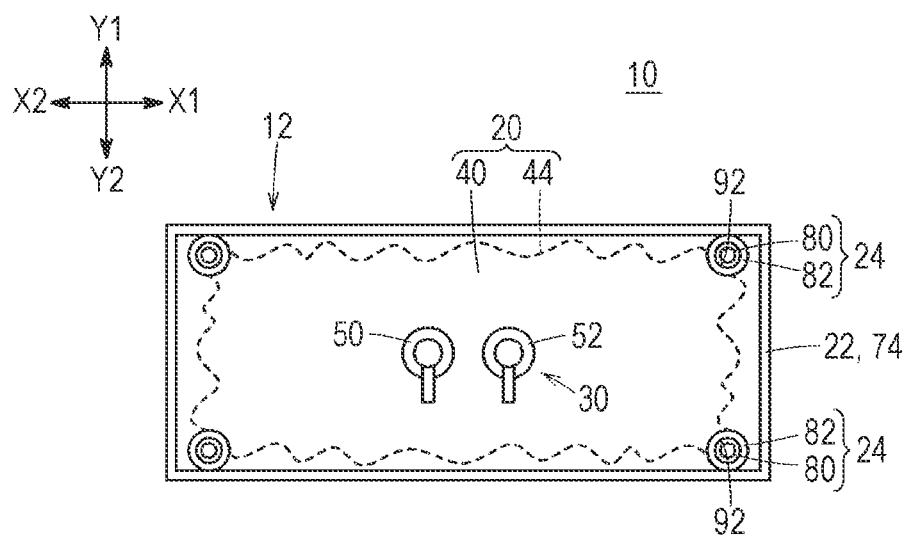
FIG. 3 is a plan view illustrating a portion of the fluid storage apparatus in a simplified manner.

FIG. 1 is a diagram illustrating, in a simplified manner, a configuration of a vehicle 10 that includes a fluid storage apparatus 12 according to an embodiment of the present disclosure. FIG. 2 is a perspective view illustrating a portion of the fluid storage apparatus 12 in a simplified manner. FIG. 3 is a plan view illustrating a portion of the fluid storage apparatus 12 in a simplified manner. In FIG. 1 to FIG. 3, FIG. 4, and FIG. 5, which will be described later, arrows X1 and X2 indicate a front-rear direction of the fluid storage apparatus 12, arrows Y1 and Y2 indicate a left-right direction of the fluid storage apparatus 12, and arrows Z1 and Z2 indicate a top-bottom direction of the fluid storage apparatus 12.

A liquid, which is a fuel (e.g., gasoline) of the vehicle 10, is stored in the fluid storage apparatus 12. The storage apparatus 12 will hereinafter be also referred to as a fuel storage apparatus 12 or a storage apparatus 12. The storage apparatus 12 includes a flexible fuel tank 20 (flexible container), a tank case 22 (container), a tank guiding mechanism 24, a fuel inflow and outflow control device 26, a remaining amount detector 28, and a gas discharge mechanism 30.

(A1-2. Fuel Tank 20)

Figure 4A:
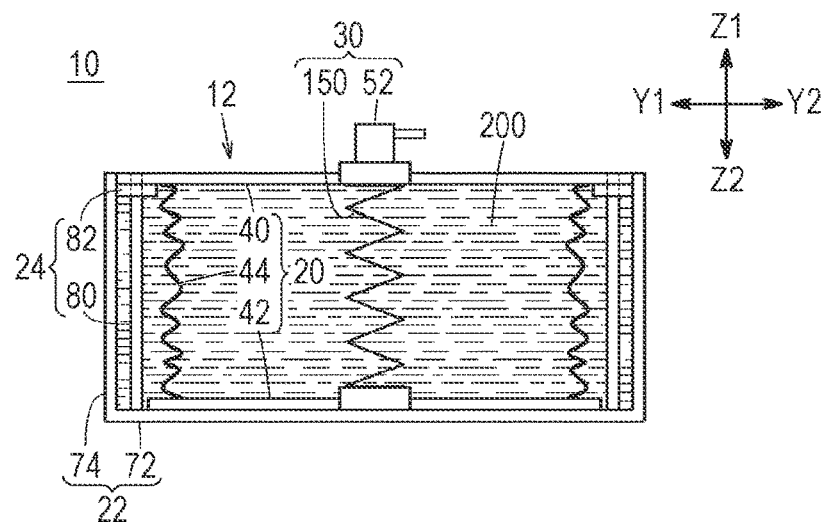
FIGS. 4A to 4C are diagrams illustrating first to third states of the fluid storage apparatus according to the embodiment.
Figure 4B:
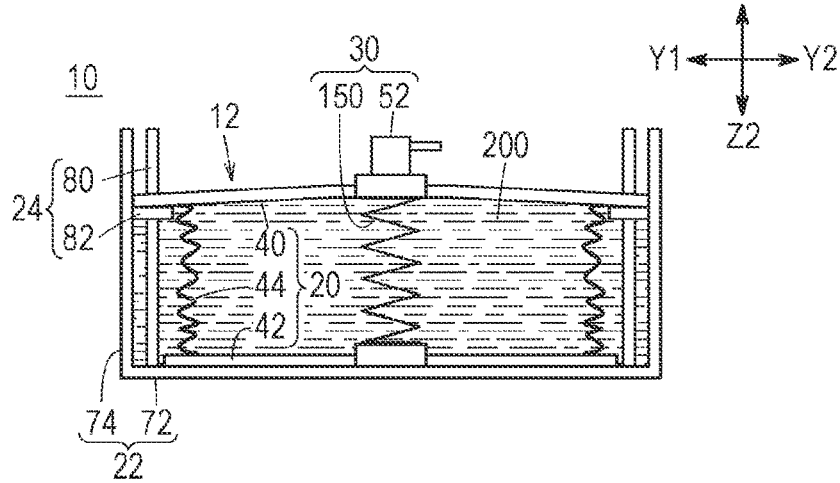
Figure 4C:
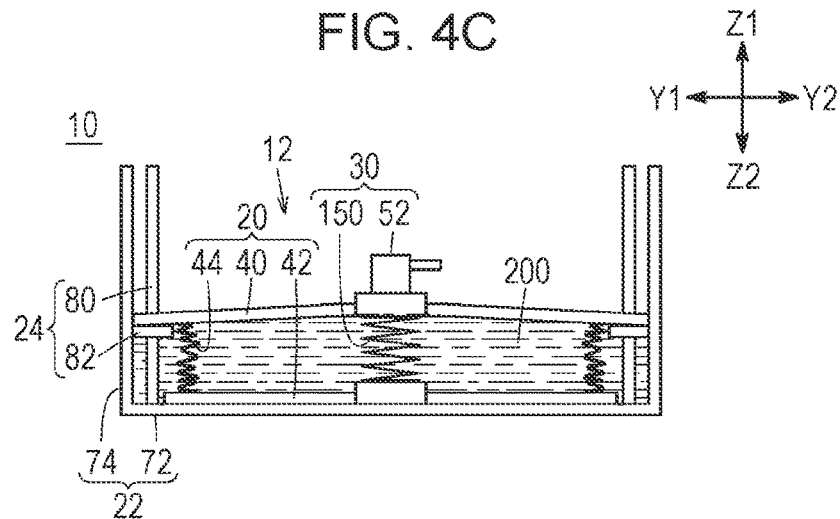

FIGS. 4A to 4C are diagrams illustrating first to third states of the fluid storage apparatus 12 according to the present embodiment. In other words, FIG. 4A illustrates a state where the fluid storage apparatus 12 is fully filled with a fuel 200. FIG. 4B illustrates a state where the fluid storage apparatus 12 is approximately half-filled with the fuel 200. FIG. 4C illustrates a state where a small amount of the fuel 200 is stored in the fluid storage apparatus 12.

As illustrated in FIG. 1 to FIG. 4C, the fuel tank 20 (hereinafter referred to also as "tank 20") includes a top plate portion 40, a bottom plate portion 42, and a side wall portion 44. As illustrated in FIG. 2 and FIG. 3, the top plate portion 40 has a shape based on a flat plate-like shape (having a rectangular main surface) and is made of, for example, a resin or a metal. As illustrated in FIGS. 4B and 4C, the top plate portion 40 has flexibility and elastically deforms by receiving an external force. However, as illustrated in FIG. 4A, the top plate portion 40 has a flat plate-like shape in a state where the fluid storage apparatus 12 is fully filled with the fuel 200 (fluid or liquid).

As illustrated in FIG. 2 and the like, a fuel injection valve 50 (inlet port) and a gas discharge valve 52 are disposed on the top plate portion 40. The fuel injection valve 50 is used when the fuel 200 is supplied to the fuel tank 20 from the outside (e.g., fuel supply apparatus). The gas discharge valve 52 is used for discharging air 202 (FIG. 5), which is present in the tank 20. The gas discharge valve 52 is included in the gas discharge mechanism 30.

Similar to the top plate portion 40, the bottom plate portion 42 has a shape based on a flat plate-like shape (having a rectangular main surface) and is made of, for example, a resin or a metal. However, unlike the top plate portion 40, the bottom plate portion 42 does not deform depending on a remaining amount Q [$m^3$] of the fuel 200, and thus, it is not necessary for the bottom plate portion 42 to have flexibility. A discharge port 54 is formed in the bottom plate portion 42 in order to supply the fuel 200 in the fuel tank 20 to the outside (e.g., engine). A fuel discharge valve 58 (discharge port) and a pump 60 are disposed along a flow path 56 extending from the discharge port 54, and the fuel 200 is supplied to an engine 62 from the fuel tank 20 by causing the pump 60 to operate.

The side wall portion 44 has a shape based on a square cylindrical shape (a rectangular parallelepiped shape in plan view) and is made of, for example, a resin or a metal. However, as illustrated in FIG. 4A to FIG. 4C, the side wall portion 44 deforms in a pleated manner, and thus, a member having higher flexibility than that of the top plate portion 40 and that of the bottom plate portion 42 is used as the side wall portion 44. In other words, the side wall portion 44 has flexibility to such an extent as to contract in accordance with a decrease in the fuel 200 in the fuel tank 20 and to expand in accordance with an increase in the fuel 200.

(A1-3. Tank Case 22)

The tank case 22 is a case (container) in which the fuel tank 20 is accommodated, and the tank case 22 is made of a material (e.g., resin or metal) having hardness higher than that of the material of the top plate portion 40 and that of the material of the side wall portion 44 of the fuel tank 20. In the present embodiment, the tank case 22 has a shape based on a rectangular parallelepiped shape and includes a top portion 70 (FIG. 2), a bottom portion 72, and a side portion 74. As will be described later, the side portion 74 is used as part of the remaining amount detector 28. Accordingly, at least a portion of the side portion 74 is formed of an electric conductor (including a conductive resin).

(A1-4. Tank Guiding Mechanism 24)

The tank guiding mechanism 24 (hereinafter referred to also as "guiding mechanism 24") guides the fuel tank 20, which has flexibility, linearly (in the vertical direction in the present embodiment) in accordance with expansion and contraction of the fuel tank 20. As illustrated in FIG. 1, FIG. 3, and the like, the guiding mechanism 24 includes guiding columns 80 and sliders 82.

The guiding columns 80 are disposed in such a manner as to correspond to four corners of the fuel tank 20 and extend linearly (in the vertical direction in the present embodiment). Each of the guiding columns 80 of the present embodiment is made of a non-conductive material. The sliders 82 are disposed at positions of upper edge portions 90 of the fuel tank 20 and are displaced along the corresponding guiding columns 80 in response to the expansion and contraction of the fuel tank 20. The sliders 82 have guiding holes 92 (FIG. 3) formed in the upper edge portions 90 (particularly upper corners) of the tank 20 and in which the corresponding guiding columns 80 are received. Here, each of the upper edge portions 90 refers to, for example, an uppermost portion (top plate portion 40) of the tank 20 or the peripheral portion. Each of the sliders 82 of the present embodiment is a ring-shaped electric conductor.

(A1-5. Fuel Inflow and Outflow Control Device 26)

The fuel inflow and outflow control device 26 controls inflow and outflow of the fuel 200 with respect to the fuel tank 20. The fuel inflow and outflow control device 26 of the present embodiment includes the fuel injection valve 50 (inlet port), the fuel discharge valve 58 (discharge port), the pump 60, and an electronic control unit 100 (hereinafter referred to as "ECU 100").

The fuel injection valve 50 controls whether the fuel 200 is supplied to the fuel tank 20 from the outside (e.g., fuel supply apparatus). The fuel discharge valve 58 controls whether the fuel 200 is supplied to the outside (engine 62 in the present embodiment) from the fuel tank 20.

As illustrated in FIG. 1, the ECU 100 includes an input/output section 110, a calculation section 112, and a memory 114. The input/output section 110 inputs and outputs signals to and from each of the units (fuel injection valve 50, gas discharge valve 52, fuel discharge valve 58, pump 60, and the like). The calculation section 112 executes programs stored in the memory 114 in such a manner as to perform detection of the remaining amount Q of the fuel 200 and the like. Programs that are to be executed by the calculation section 112 and data used in the calculation section 112 are stored in the memory 114. The data may include a map that defines a relationship between positions of the sliders 82 (a voltage V and a current I (or a resistance R based on the voltage V and the current I), which will be described later) and the remaining amount Q. The calculation section 112 includes a fuel inflow and outflow control section 120, a remaining amount calculation part 122, a display control part 124, and a gas discharge control part 126.

The fuel inflow and outflow control section 120 controls the fuel injection valve 50 (inlet port), the fuel discharge valve 58 (discharge port), and the pump 60 in response to an input from the outside. Since the remaining amount calculation part 122 and the display control part 124 are included in the remaining amount detector 28, they will be described later in association with the remaining amount detector 28. Since the gas discharge control part 126 is included in the gas discharge mechanism 30, it will be described later in association with the gas discharge mechanism 30.

(A1-6. Remaining Amount Detector 28)

The remaining amount detector 28 detects the remaining amount Q of the fuel 200 and informs an occupant of the remaining amount Q. The remaining amount detector 28 of the present embodiment includes the ECU 100 (particularly the remaining amount calculation part 122 and the display control part 124), an electric circuit 130, a voltage sensor 132, a current sensor 134, and a display 136.

The electric circuit 130 includes the sliders 82 of the guiding mechanism 24, the side portion 74 of the tank case 22, a direct-current (DC) power supply 140 (hereinafter referred to also as "power supply 140"), and an on-off switch 142. One electrode (here, positive electrode) of the DC power supply 140 is connected to the sliders 82 via a power line 144. The sliders 82 are in contact with an inner peripheral surface 146 of the side portion 74. A lower portion of the side portion 74 is in contact with the other electrode (here, negative electrode) of the power supply 140 via the power line 144. As a result, the electric circuit 130 is a closed circuit when the on-off switch 142 is in an ON state.

As described above, the sliders 82 are disposed at the positions of the upper edge portions 90 of the fuel tank 20, which has flexibility. Thus, the sliders 82 are displaced linearly (in the vertical direction in the present embodiment) in response to the expansion and contraction of the fuel tank 20. When the sliders 82 are displaced linearly, contact positions Pc at each of which the side portion 74 of the tank case 22 and one of the sliders 82 are in contact with each other change linearly. Accordingly, the resistance R in the side portion 74 varies in accordance with fluctuations of the distances from the contact positions Pc to the lower portion of the side portion 74. In other words, the sliders 82 and the side portion 74 of the tank case 22 constitute a variable resistance. The value of the variable resistance corresponds to the contact positions Pc (positions of the sliders 82 in the vertical direction). When the contact positions Pc (positions of the sliders 82 in the vertical direction) are determined, the remaining amount Q of the fuel 200 in the fuel tank 20 may be determined.

The voltage sensor 132 detects the voltage V of the electric circuit 130 (or the power supply 140) and outputs the voltage V to the ECU 100. The current sensor 134 detects the current I in the electric circuit 130 (or the power line 144) and outputs the current I to the ECU 100.

As described above, the ECU 100 includes the input/output section 110, the calculation section 112, and the memory 114. The calculation section 112 includes the remaining amount calculation part 122 and the display control part 124, which are parts of the remaining amount detector 28. The data stored in the memory 114 may include a map that defines a relationship between the contact positions Pc of the sliders 82 with respect to the side portion 74 of the tank case 22 (the voltage V and the current I (or the resistance R based on the voltage V and the current I)) and the remaining amount Q.

The remaining amount calculation part 122 calculates the remaining amount Q of the fuel 200 on the basis of the voltage V and the current I. In this case, the map stored in the memory 114 may be used. The display control part 124 causes the display 136 to display the remaining amount Q calculated by the remaining amount calculation part 122.

Note that the remaining amount Q may be detected by using an ultrasonic sensor. For example, an ultrasonic sensor is disposed on the top plate portion 40 and caused to generate ultrasonic waves downward in the vertical direction. Then, a reflected wave from the bottom plate portion 42 is detected, and the distance from the ultrasonic sensor to the bottom plate portion 42 is determined on the basis of the period from when the ultrasonic waves are generated until the reflected wave is received. In addition, the remaining amount Q is calculated on the basis of the determined distance.

The display 136 is configured to display the remaining amount Q in response to a command from the ECU 100 and included in, for example, a meter (not illustrated) of the vehicle 10.

(A1-7. Gas Discharge Mechanism 30)

Figure 5:
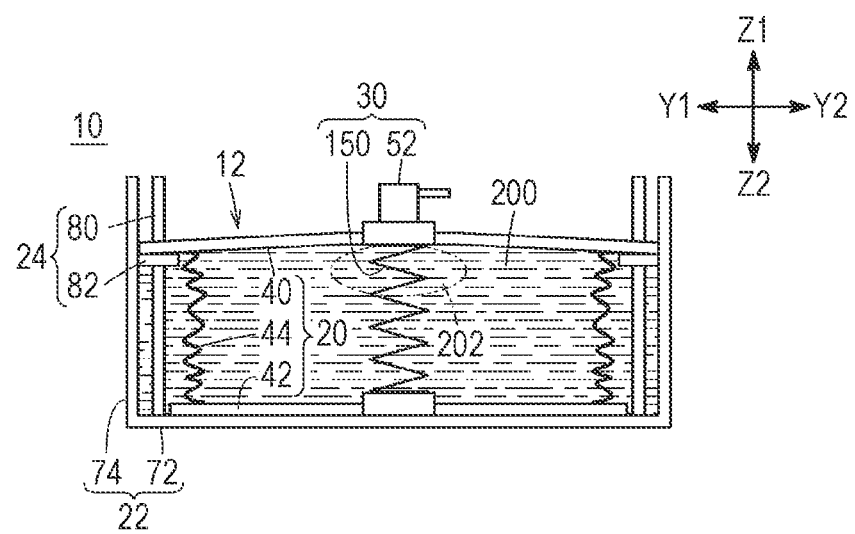
FIG. 5 is a diagram illustrating a function of a gas discharge mechanism according to the embodiment.

FIG. 5 is a diagram illustrating a function of the gas discharge mechanism 30 according to the present embodiment. The gas discharge mechanism 30 is used for discharging the air 202 (FIG. 5), which is present in the tank 20. The gas discharge mechanism 30 includes the gas discharge valve 52 and a coil spring 150. As illustrated in FIG. 1, the coil spring 150 is disposed between the top plate portion 40 and the bottom plate portion 42 in the tank 20 and urges the top plate portion 40 in such a manner as to position a portion of the top plate portion 40 on which the gas discharge valve 52 is disposed (a center portion of the top plate portion 40 in the present embodiment) higher than other portions of the top plate portion 40 (see FIG. 4B and FIG. 4C). Note that when the fuel tank 20 is fully filled with the fuel 200, the top plate portion 40 is substantially flat (FIG. 4A).

A2. Advantageous Effects of Embodiment

As described above, according to the present embodiment, when the fuel tank 20 (flexible container) expands or contracts, the sliders 82, which are disposed on the fuel tank 20, are guided linearly by the corresponding guiding columns 80 (FIG. 4A to FIG. 4C). Therefore, occurrence of deviation in the position of the fuel tank 20 may be suppressed.

In addition, according to the present embodiment, the fuel tank 20 is supported by the guiding columns 80 via the sliders 82. Consequently, the reproducibility of changes in the position of the tank 20 in response to fluctuations of the remaining amount Q of the fuel 200 (amount of a fluid) may be improved. Therefore, in the case where the remaining amount Q is detected in accordance with the position of the tank 20, the remaining amount Q may be detected with high accuracy.

In the present embodiment, each of the sliders 82 is an electric conductor. The fluid storage apparatus 12 includes the tank case 22 (container), in which the fuel tank 20 (flexible container) is accommodated, the voltage sensor 132 (position detector), which is formed on the side on which the tank case 22 is disposed and which detects the voltage V, the current sensor 134 (position detector), which is formed on the side on which the tank case 22 is disposed and which detects the current I, the voltage V and the current I denoting the positions of the sliders 82, and the remaining amount calculation part 122, which calculates the remaining amount Q on the basis of the contact positions Pc of the sliders 82 (FIG. 1).

Accordingly, the remaining amount Q may be detected on the basis of a degree of the expansion and contraction of the fuel tank 20 in accordance with an actual remaining amount Q. Thus, the accuracy with which the remaining amount Q is detected may be improved compared with, for example, a configuration in which the remaining amount Q is detected on the basis of the difference between an injection amount of the fuel 200 and a discharge amount of the fuel 200. In addition, in the case where the fluid storage apparatus 12 is used in combination with another remaining amount sensor (e.g., the above-mentioned ultrasonic sensor) that detects the remaining amount Q, the detection accuracy may be improved, or a fail-safe mechanism may be realized.

In the present embodiment, the top plate portion 40 (top surface) of the fuel tank 20 (flexible container) is planar when the fuel tank 20 is fully filled with the fuel 200 (FIG. 1 to FIG. 3). The fluid storage apparatus 12 includes the gas discharge valve 52, which is disposed on the top plate portion 40 of the fuel tank 20 and which discharges the air 202 (gas) in the fuel tank 20, and the gas discharge mechanism 30 (top-surface-shape control mechanism) that controls the shape of the top plate portion 40 in such a manner as that a valve-arranged portion that is the portion of the top plate portion 40, on which the gas discharge valve 52 is disposed, is positioned higher than the other portions of the top plate portion 40 (FIG. 1 to FIG. 4C).

According to the above-described embodiment, the air 202 in the fuel tank 20 may accumulate in the gas discharge valve 52. Therefore, in the case where the fuel 200 is volatile, the volatilization volume of the fuel 200 may be reduced.

In the present embodiment, the gas discharge mechanism 30 (top-surface-shape control mechanism) includes the coil spring 150 (an urging member), which urges the valve-arranged portion upward (FIG. 1). Therefore, even in the case where the gas discharge valve 52 is disposed on the top plate portion 40, the valve-arranged portion may easily be positioned higher relative to the other portions of the top plate portion 40.

In the present embodiment, when the fuel tank 20 is fully filled with the fuel 200 (fluid), the fuel tank 20 has a shape based on a rectangular parallelepiped shape (FIG. 1 to FIG. 3). The guiding columns 80 are disposed in such a manner as to correspond to the four corners of the fuel tank 20 (FIG. 3). The sliders 82 are disposed in such a manner as to correspond to the upper corners of the fuel tank 20 (FIG. 1 and FIG. 3). Consequently, the fuel tank 20 has a relatively simple shape. Therefore, the fuel tank 20 may be easily manufactured, and accommodation of the fuel tank 20 in the vehicle 10 (apparatus), which uses the fuel tank 20, may be facilitated.

B. Modification

Note that the present disclosure is not limited to the above-described embodiment, and it is obvious that various configurations based on the contents of the present specification may be employed. For example, the following configuration may be employed.

B1. Applications

In the above-described embodiment, the case where the present disclosure is applied to the fluid storage apparatus 12 mounted on the vehicle 10 has been described (FIG. 1). However, from the standpoint of an apparatus that includes a flexible container, which contains a fluid, applications of the present disclosure are not limited to this configuration. For example, the present disclosure may be applied to moving objects such as ships and aircrafts. Alternatively, the present disclosure may be applied to manufacturing apparatuses, home appliances, and the like. In this case, a fluid to be stored in the fluid storage apparatus 12 may be a liquid other than the fuel 200 (e.g., water) or gas.

B2. Fuel Tank 20 (Flexible Container)

In the above-described embodiment, the top plate portion 40 of the fuel tank 20 has a flat plate-like shape (FIG. 1 to FIG. 3). However, from the standpoint of a flexible container, the shape of the top plate portion 40 is not limited to a flat plate-like shape. For example, the top plate portion 40 may have a curved shape.

In the above-described embodiment, the fuel tank 20 has a shape based on a rectangular parallelepiped shape (FIG. 1 to FIG. 3). However, for example, from the standpoint of a flexible container, the shape of the fuel tank 20 is not limited to this shape. The fuel tank 20 may have a shape based on a truncated pyramid-like shape, a spherical shape, or a hemispherical shape.

In the above-described embodiment, the top plate portion 40, the bottom plate portion 42, and the side wall portion 44 of the fuel tank 20 are made of different materials. However, for example, from the standpoint of a flexible container, the top plate portion 40, the bottom plate portion 42, and the side wall portion 44 are not limited to being made of different materials, and two or all of the top plate portion 40, the bottom plate portion 42, and the side wall portion 44 may be made of the same material.

B3. Tank Case 22 (Container)

In the above-described embodiment, the tank case 22 is provided as a case (container) dedicated to the fuel tank 20 (FIG. 1, FIG. 2, and the like). However, for example, from the standpoint of using the guiding columns 80 and the sliders 82, the present disclosure is not limited to this configuration. For example, a body (or casing) of the vehicle 10 (apparatus) may be used as a case (container) of the fuel tank 20 instead of providing a case dedicated to the fuel tank 20.

B4. Tank Guiding Mechanism 24 (Guiding Mechanism)

In the above-described embodiment, the guiding columns 80 and the sliders 82 are disposed at the four corners of the fuel tank 20, which has a shape based on a rectangular parallelepiped shape (FIG. 3). However, for example, from the standpoint of guiding the fuel tank 20 by using the guiding columns 80 and the sliders 82 or from the standpoint of detecting the remaining amount Q of the fuel 200, the present disclosure is not limited to this configuration. For example, one to three pairs of the guiding columns 80 and the sliders 82 may be disposed in such a manner as to correspond to one to three of the corners of the fuel tank 20. Alternatively, the guiding columns 80 and the sliders 82 may be disposed in such a manner as to correspond to other portions of the fuel tank 20 other than the corners of the fuel tank 20. Note that, from the standpoint of maintaining the position of the fuel tank 20, it is preferable that at least two pairs of the guiding columns 80 and the sliders 82 be disposed at positions (e.g., diagonal positions) facing each other with the fuel tank 20 interposed therebetween.

In the above-described embodiment, all portions of the sliders 82 have conductivity. However, for example, from the standpoint of detecting the remaining amount Q of the fuel 200, the present disclosure is not limited to this configuration. For example, only portions of the sliders 82 that are in contact with the power line 144 and the inner peripheral surface 146 of the tank case 22 may have conductivity, and other portions of the sliders 82 may be non-conductive. Alternatively, for example, from the standpoint of guiding the fuel tank 20 by using the guiding columns 80 and the sliders 82, all portions of the sliders 82 may be non-conductive.

In the above-described embodiment, each of the sliders 82 has a ring shape (FIG. 3). However, for example, from the standpoint of being displaced along the guiding columns 80, each of the sliders 82 is not limited to having a ring shape. For example, each of the sliders 82 may have a shape (e.g., C shape) formed by removing a portion of a ring. Alternatively, each of the sliders 82 may be formed in a shape based on a rectangular ring shape. Note that, presumably, it is often preferable that the cross-sectional shape of each of the guiding columns 80 follow the shape of the corresponding slider 82.

In the above-described embodiment, the guiding columns 80 are formed separately from the tank case 22 (FIG. 1 and the like). However, the guiding columns 80 may be formed as portions of the tank case 22. In this case, the sliders 82 may be guided along the corresponding guiding columns 80 by forming each of the sliders 82 into, for example, a shape formed by removing a portion of a ring or the like as described above.

B5. Remaining Amount Detector 28

In the above-described embodiment, the resistance R, which is a variable resistance, is constituted by the inner peripheral surface 146 of the side portion 74 of the tank case 22 and the sliders 82 (FIG. 1). However, from the standpoint of detecting the positions of the sliders 82, the present disclosure is not limited to this configuration. For example, the resistance R may constituted by using the sliders 82 in combination with the guiding columns 80 instead of the side portion 74.

In the above-described embodiment, the remaining amount detector 28 uses the voltage sensor 132 and the current sensor 134 in order to detect the contact positions Pc of the sliders 82 (FIG. 1). However, from the standpoint of detecting the remaining amount Q (amount of a fluid) on the basis of the contact positions Pc of the sliders 82, the present disclosure is not limited to this configuration. For example, a laser displacement gauge or an ultrasonic sensor that detects the positions of the sliders 82 in the vertical direction (Z1-Z2 direction) may be provided, and the positions of the sliders 82 may be detected on the basis of an output of the laser displacement gauge or the ultrasonic sensor.

In the above-described embodiment, the remaining amount Q of the fuel 200 (amount of a fluid) that has been detected by the remaining amount detector 28 is displayed on the display 136 (FIG. 1). However, from the standpoint of outputting the remaining amount Q (amount of a fluid), the present disclosure is not limited to this configuration. For example, the detected remaining amount Q may be output as an audio from a speaker, which is not illustrated. Alternatively, the detected remaining amount Q may be output to an external server via a communication device, which is not illustrated, and may be used in processing (e.g., fuel consumption management and the like) in the external server.

In the above-described embodiment, the remaining amount detector 28 is provided in order to detect the remaining amount Q of the fuel 200 (FIG. 1). However, focusing on the function of the tank guiding mechanism 24, the remaining amount detector 28 may be omitted.

B6. Gas Discharge Mechanism 30

In the above-described embodiment, the coil spring 150 is used in order to position the portion (valve-arranged portion) of the top plate portion 40, on which the gas discharge valve 52 is disposed, higher than the other portions of the top plate portion 40 (FIG. 1 and the like). However, for example, from the standpoint of positioning the valve-arranged portion higher than the other portions of the top plate portion 40, the present disclosure is not limited to this configuration. For example, another spring (e.g., plate spring) may be used instead of the coil spring 150 so as to urge the valve-arranged portion upward in the vertical direction. Alternatively, a spring (e.g., coil spring) or a weight that pulls a portion of the top plate portion 40 other than the valve-arranged portion downward in the vertical direction may be used.

In the above-described embodiment, the gas discharge control part 126 of the ECU 100 controls opening and closing of the gas discharge valve 52. However, for example, from the standpoint of discharging the air 202 in the fuel tank 20, the present disclosure is not limited to this configuration. For example, the gas discharge valve 52 may be a check valve that opens and closes in accordance with a pressure difference between an area inside the fuel tank 20 and an area outside the fuel tank 20 and may open and close without being controlled by the ECU 100.

In the above-described embodiment, the gas discharge mechanism 30 is provided in order to discharge the air 202 in the fuel tank 20 (FIG. 1). However, focusing on the function of the tank guiding mechanism 24, the gas discharge mechanism 30 may be omitted. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A fluid storage apparatus comprising:
    a flexible container that includes an inlet port, through which a fluid is injected, and a discharge port, through which the fluid is discharged, and that expands and contracts in accordance with an amount of the fluid in the flexible container; and
    a guiding mechanism that linearly guides the flexible container in accordance with expansion and contraction of the flexible container,
    wherein the guiding mechanism includes
        a guiding column provided adjacent to the flexible container and extending linearly, and
        a slider provided on an upper end portion of the flexible container and including a guiding hole in which the guiding column is inserted,
    wherein the fluid storage apparatus further comprises
    a top-surface-shape control mechanism that comprises a gas discharge valve that is disposed on a top surface of the flexible container and that discharges gas present in the flexible container, the top-surface-shape control mechanism controlling a shape of the top surface in such a manner as that a valve-arranged portion, which is a portion of the top surface on which the gas discharge valve is disposed, is positioned higher than other portions of the top surface,
    wherein the fluid is a liquid,
    wherein the top surface of the flexible container is planar when the flexible container is fully filled with the liquid,
    wherein the flexible container includes a top plate having the top surface, the top plate is flexible, and
    the top-surface-shape control mechanism deforms the top plate such that the valve-arranged portion is positioned higher than other portions of the top surface when the fluid is reduced.

2. The fluid storage apparatus according to claim 1,
    wherein at least a portion of the slider is made of an electric conductor, and
    wherein the fluid storage apparatus further comprises:
        a container in which the flexible container is accommodated;
        a position detector provided to the container and detecting a position of the electric conductor; and
        a remaining amount calculation part that calculates a remaining amount of the fluid based on the position of the electric conductor.

3. The fluid storage apparatus according to claim 1,
    wherein the top-surface-shape control mechanism includes an urging member that urges the valve-arranged portion upward.

4. The fluid storage apparatus according to claim 3,
    wherein the urging member urges a portion of the top plate upward to deform the top plate such that the valve-arranged portion is positioned higher than other portions of the top surface when the fluid is reduced.

5. The fluid storage apparatus according to claim 1,
    wherein the flexible container has a substantially rectangular parallelepiped shape when the flexible container is fully filled with the fluid,
    wherein a plurality of the guiding columns are respectively disposed corresponding to four corners of the flexible container, and
    wherein each of upper corners of the flexible container includes the slider.

6. The fluid storage apparatus according to claim 1,
    wherein the slider linearly slides along the guiding column in accordance with vertical expansion and contraction of the flexible container.

7. The fluid storage apparatus according to claim 1,
    comprising a first guiding column of the guiding column and a second guiding column of the guiding column,
    wherein the first guiding column and the second guiding column are positioned opposite to each other, and
    wherein the flexible container includes a first slider of the slider corresponding to the first guiding column and a second slider of the slider corresponding to the second guiding column.

8. The fluid storage apparatus according to claim 7, wherein the first guiding column and the second guiding column are positioned diagonally opposite to each other at corners of the flexible container.

9. The fluid storage apparatus according to claim 1, wherein the slider is provided on an upper edge of the flexible container.

10. A vehicle comprising the fluid storage apparatus according to claim 1.

11. A fluid storage apparatus comprising:
    a flexible container that includes an inlet port, through which a fluid is injected, and a discharge port, through which the fluid is discharged, and that expands and contracts in accordance with an amount of the fluid in the flexible container; and
    a guiding mechanism that linearly guides the flexible container in accordance with expansion and contraction of the flexible container,
    wherein the guiding mechanism includes a guiding column provided adjacent to the flexible container and extending linearly, and
a slider provided on an upper end portion of the flexible container and including a guiding hole in which the guiding column is inserted,
wherein the fluid storage apparatus further comprises
a top-surface-shape control mechanism that comprises a gas discharge valve that is disposed on a top surface of the flexible container and that discharges gas present in the flexible container, the top-surface-shape control mechanism controlling a shape of the top surface in such a manner as that a valve-arranged portion, which is a portion of the top surface on which the gas discharge valve is disposed, is positioned higher than other portions of the top surface,
wherein the fluid is a liquid,
wherein the top surface of the flexible container is planar when the flexible container is fully filled with the liquid,
wherein the top-surface-shape control mechanism includes an urging member that urges the valve-arranged portion upward,
wherein the flexible container includes a top plate having the top surface, the top plate is flexible, and
the urging member urges a portion of the top plate upward to deform the top plate such that the valve-arranged portion is positioned higher than other portions of the top surface when the fluid is reduced.

* * * * *